United States Patent Office 2,693,073
Patented Nov. 2, 1954

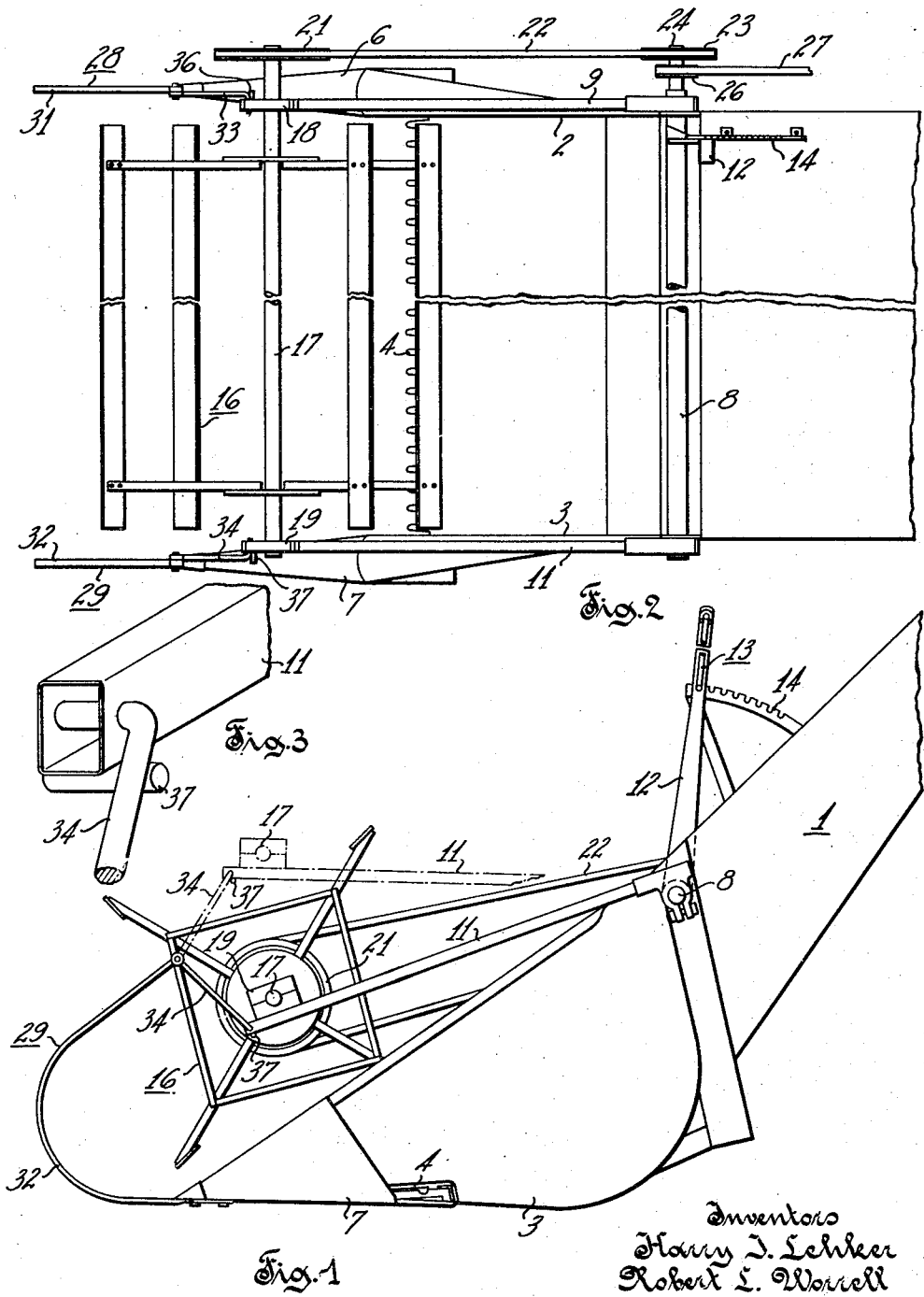

2,693,073
HARVESTER DIVIDER EXTENSION

Harry J. Lehker, North Liberty, and Robert L. Worrell, La Porte, Ind., assignors to Allis-Chalmers Manufacturing Company, West Allis, Wis.

Application July 27, 1953, Serial No. 370,563

4 Claims. (Cl. 56—314)

This invention relates generally to harvesters and more particularly to an improvement in divider extensions.

In the prior art many of the reels are attached to the header for up and down swinging movement therewith, while others are mounted for up and down swinging movement with the header and for up and down swinging movement relative thereto. It is the latter class of combine harvesters to which this invention is particularly applicable. In the prior art, this latter class of harvesters sometimes utilized resilient members extending from each divider on the header to one end of the reel. The disadvantage of this type of construction is that the reels in combine harvesters are relatively heavy and great force was required to adjust same to its extreme positions against the bias of the resilient members.

It is therefore an object of this invention to provide a continuous divider extension between a reel end and divider point without affecting the amount of force required to raise or lower the reel relative to a divider.

Another object of this invention is to provide an extension between divider points and reel ends which permit adjustment of the reel vertically relative to a header without unduly flexing the extension.

Another object of this invention is to provide an extension between divider points and reel ends which forms an auxiliary support and guide for the reel when it is being raised and lowered and without materially affecting the amount of force required to adjust the height of the reel relative to the divider points.

Another object of this invention is to provide an efficient divider extension which prevents clogging of material on arms supporting a reel structure.

Accordingly, the invention may be considered as consisting of the various details of construction, correlation of elements and arrangement of parts as is more fully set forth in the appended claims and the detailed description, reference being had to the accompanying drawings, in which:

Fig. 1 is a side elevation of a header for a combined harvester-thresher embodying the invention and showing a reel structure in broken lines in an adjusted position;

Fig. 2 is a plan view of the structure shown in Fig. 1;

Fig. 3 is an enlarged perspective view of a detail of Fig. 1 showing a stop member and a reel support arm in raised position;

Referring to Fig. 1 it is seen that the invention may be applied to a header 1 for a harvesting machine (not shown). Header 1 has transversely spaced apart side walls 2 and 3 and a transversely extending sickle structure 4 (see Fig. 2) carried along the front end thereof which is operatively connected to conventional power means (not shown). Attached to the forward ends of side walls 2 and 3 are divider points 6 and 7, respectively. A transversely extending rock shaft 8 is journaled in side walls 2 and 3 and has forwardly extending arms 9 and 11 attached to opposite end portions thereof for movement therewith. A lever 12 is attached at one end of shaft 8 and has a detent mechanism 13 adjacent the upper end thereof coacting with a notched quadrant 14 for maintaining shaft 8 and arms 9 and 11 in desired adjusted position. A reel structure 16 is attached to a shaft 17 journaled in bearings 18 and 19 carried by arms 9 and 11, respectively. Attached to one end of shaft 17 is a pulley 21 driven by a V-belt 22 passing around pulley 21 and pulley 23 attached to a stub shaft 24 journaled in side wall 2, and by means of a pulley 26 attached to stub shaft 24 and a V-belt 27 passing around pulley 26 and a source of power, not shown, in driving relation thereto.

Attached to the forward ends of divider points 6 and 7 are extension devices 28 and 29, respectively, which form forwardly looping continuous extensions of divider points 6 and 7 to points of connection with the forward ends of arms 9 and 11, respectively. Extension devices 28 and 29 include resilient or spring elements 31 and 32, respectively, attached to the forward ends of divider points 6 and 7, respectively, and links or toggle members 33 and 34, respectively.

Link or toggle member 34 is pivotally attached to the rearward end of resilient member 32 and at its other end is pivotally attached to the forward end of arm 11 adjacent bearing 19. Both of these pivotal connections of link 34 are to permit relative movement of link 34 about horizontal axes passing through its connection with arm 11 and resilient member 32. Link 33 is similarly pivotally connected to resilient member 31 and arm 9.

Attached to the lower front ends of arms 9 and 11 are stop members 36 and 37, respectively (see Figs. 2 and 3), which limit the counterclockwise pivotal movement of links 33 and 34 about arms 9 and 11, respectively, as viewed in Fig. 1. The purpose of these stop members is to prevent possible jackknifing of the links 33 and 34 when reel 16 is raised to its extreme position as shown in broken lines in Fig. 1.

As harvesters (not shown) having a header structure, as was previously described, move through a field to be harvested, divider extensions 31 and 32 divide the crop that is to be harvested from the crop that is to be left standing. The crop that is to be left standing is guided out of the way of contact with the harvester by sliding along the outer surfaces of extensions 31 and 32, links 33 and 34, divider points 6 and 7 and possibly the outer surfaces of arms 9 and 11.

Dependent on the condition of the crop, reel structure 16 is positioned by actuating lever 12 to a desired height somewhere between the two extreme positions shown in Fig. 1. This reel structure may be readily adjusted as to height by manipulating lever 12. During such adjustment links 33 and 34 pivot about their end connections with very little movement of resilient members 31 and 32 and therefore with little or no additional force being required to raise or lower reel structure 16 due to the fore and aft flexing of resilient members 31 and 32.

This divider extension construction 28 and 29 not only provides efficient guiding and dividing of the crop but also furnishes an auxiliary support and guide for the reel structure 16.

If desired, only one side of the header need be equipped with a divider extension such as 29 as the other side of the header can be operated on the stubbleward side of the field.

The present invention is applicable to all harvesters utilizing a reel structure. And accordingly it should be understood that it is not intended to limit the invention to the exact details of construction and combination herein disclosed by way of example, as various modifications within the scope of the appended claims may occur to persons skilled in the art.

It is claimed and desired to secure by Letters Patent:

1. In a harvesting machine having a header including a divider on at least one side of said header at the front end thereof and a reel rotatably mounted at the forward end of a pair of transversely spaced arms pivotally attached at their rear ends to said header for up and down swinging movement about a horizontal axis, the improvement comprising a device forming a continuous extension of said divider to a point of connection with the forward end of the adjacent of said arms, said device including a resilient element attached to said dividers and forming a forward extension thereof and a link member pivotally connected at the ends thereof to the forward end of said adjacent arm and to the rearward end of said resilient element for relative up and down swinging movement about said pivotal connections.

2. In a harvesting machine having a header including dividers on either side at the front end thereof and a reel rotatably mounted at the forward end of a pair of transversely spaced arms pivotally attached at their rear ends to said header for up and down swinging movement about a horizontal axis, the improvement comprising devices forming continuous extensions of said dividers to points of connection with adjacent forward ends of said arms, each of said devices including a resilient element attached to one of said dividers and forming a forward extension thereof and a link member pivotally connected at the ends thereof to the forward end of one of said arms and to the rearward end of one of said resilient elements for relative up and down swinging movement about said pivotal connections.

3. In a harvesting machine having a header including transversely spaced sides having dividers on the front ends thereof and a reel rotatably mounted at the forward end of a pair of transversely spaced arms pivotally attached at their rear ends to said sides for up and down swinging movement about a horizontal axis, the improvement comprising devices forming continuous extensions of said dividers to points of connection with adjacent forward ends of said arms, each of said devices including a resilient element attached to one of said dividers and forming a forwardly looping extension thereof and a link member pivotally attached at the ends thereof to the forward end of one of said arms and to the rearward end of one of said resilient elements for relative up and down swinging movement about said pivotal attachments, and stop members carried by the forward ends of said arms for limiting the pivotal movement of said links relative to said arms in one direction.

4. In a harvesting machine having a header including transversely spaced sides having dividers on the front ends thereof and a reel mounted on a shaft journaled in the forward ends of a pair of transversely spaced arms pivotally attached at their rear ends to said sides for up and down swinging movement about a transverse horizontal axis, the improvement comprising devices forming continuous extensions of said dividers to points of connection with adjacent forward ends of said arms, each of said devices including a resilient element attached to one of said dividers and forming a forwardly looping extension thereof and a link member pivotally attached at the ends thereof to the forward end of one of said arms and to the rearward end of one of said resilient elements for relative up and down swinging movement about said pivotal attachments, and stop members carried by forward ends of said arms and coacting with said links for limiting the pivotal movement of said links relative to said arms in one direction.

No references cited.